United States Patent [19]

Huignard

[11] 3,874,785
[45] Apr. 1, 1975

[54] OPTICAL DEFLECTOR ARRANGEMENT FOR USE IN HOLOGRAPHIC DATA STORAGE DEVICES

[75] Inventor: Jean Pierre Huignard, Paris, France

[73] Assignee: Thomson-CSF, Paris, France

[22] Filed: May 29, 1973

[21] Appl. No.: 364,758

[30] Foreign Application Priority Data
June 2, 1972 France .............................. 72.19939

[52] U.S. Cl. ................... 350/161, 350/3.5, 350/285
[51] Int. Cl. ........................................... G02b 27/38
[58] Field of Search ............... 350/6, 7, 285, 161; 340/173 LT; 178/6.7 A

[56] References Cited
UNITED STATES PATENTS

| | | | |
|---|---|---|---|
| 3,397,605 | 8/1968 | Brueggemann | 350/161 |
| 3,504,609 | 4/1970 | Donald | 350/285 |
| 3,530,780 | 9/1970 | Haynes | 95/4.5 |
| 3,625,585 | 12/1971 | Beiser | 350/6 |
| 3,657,473 | 4/1972 | Corcoran | 178/6.7 A |

Primary Examiner—Ronald J. Stern
Attorney, Agent, or Firm—Cushman, Darby & Cushman

[57] ABSTRACT

The present invention relates to optical data recording and read-out. More particularly, it is concerned with optical deflector arrangements used in holographic storage devices. In accordance with the invention, there is provided an optical deflector arrangement wherein a beam projected onto a storage area can be steered to take n distinct angular position making it possible the selective record or read out of a plurality of elementary holograms superimposed on one another in said area.

4 Claims, 2 Drawing Figures

OPTICAL DEFLECTOR ARRANGEMENT FOR USE IN HOLOGRAPHIC DATA STORAGE DEVICES

The present invention relates to an optical deflector arrangement more particularly applicable to high-density data recording and reading systems based upon holography.

Those skilled in the art will appreciate that the recording of data is carried out, in this technique, by illuminating a plate of photosensitive material simultaneously with two coherent lightbeams, one of the beams, the object beam, illuminating a plane known as the object plane and containing the data for recording, whilst the other beam constitutes a reference beam. Once chemically processed, the photosensitive plate constitutes a hologram which, when illuminated by a read-out lightbeam, reconstructs at least one image of the object plane. This latter reconstructed image when projected upon a matrix of photodetectors, makes it possible to utilise the data thus recorded.

For the high-density storage of data, it is well-known to divide the surface of the holographic storage plate into a plurality of adjacent zones or pages, each of which is constituted by the hologram of a flat, well-defined modulating object, arranged in said object plane.

In this manner, it is possible to produce optical storage devices whose capacity has a top limit, dictated by technological considerations, in the order of $10^{10}$ information bits.

To obtain higher capacities, it is therefore necessary to have recourse to a different kind of organisation which provides for the recording of several holograms within one and the same page of the storage plate. In each case, each hologram represents a well-defined object the recording of which is characterised by a particular value of the angle of the reference beam in relation to the object beam. On reading out the data contained in anyone of said holographic storage pages, the read-out beam must successively reproduce the same angular positions which the reference beam occupied at the time of recording, these positions being defined with reference to the storage plane for example, in order to obtain optimum conditions of reconstitution of the data recorded. It is therefore necessary to provide an optical deflector arrangement which makes it possible, for the full recording of a storage page, to vary the orientation of the reference beam and, for the selective read-out of one of the elementary holograms superimposed on said page, to produce a read-out beam which reproduces highly accurately that of the angular positions of the reference beam which has been formerly used for constructing said elementary hologram.

In accordance with a first object of the present invention, there is provided an optical deflector arrangement for electrically steering and focussing onto a predetermined area a parallel beam of radiant energy, said optical deflector arrangement comprising: a telecentric lens positioned for receiving said parallel beam, an intermediate lens having an anterior focal plane coincident with the rear focal plane of said telecentric lens, a projection lens positioned for focussing onto said predetermined area the radiant energy emerging from said intermediate lens, and electrically controllable optical deflector means positioned in said coincident focal planes for controlling the direction of the focussed radiant energy incident onto said predetermined area.

A further object of the present invention is a holographic data storage device incorporating an optical deflector arrangement giving either to the reference beam or to the read-out beam anyone of n angular positions for each page of the storage plane.

For a better understanding of the invention, and to show how the same may be carried into effect, reference will be made to the ensuing description, and the attached figures, among which:

Figure 1:
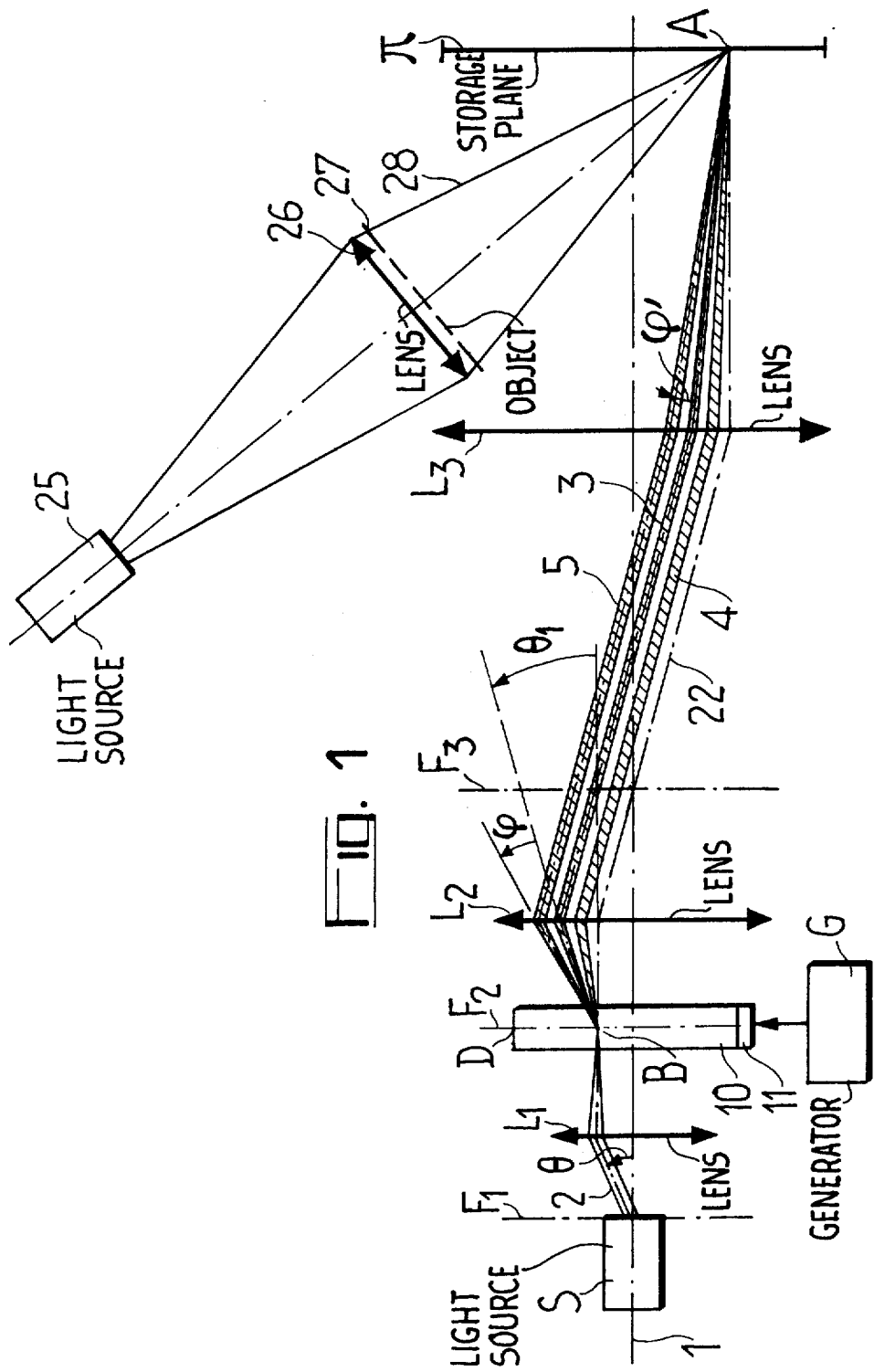
FIG. 1 shows an optical deflector arrangement, and the essential parts of an holographic data storage device in accordance with the invention.

FIG. 1 illustrates a lightsource S, a first telecentric convergent lens $L_1$ with an anterior focal plane $F_1$ and a rear focal plane $F_2$, a deflector D arranged so that the plane $F_2$ is located within said deflector, an intermediate convergent lens $L_2$ with a rear focal plane $F_3$ and an anterior focal plane coinciding with the focal plane $F_2$, and a projection convergent lens $L_3$ whose anterior focal plane coincides with the focal plane $F_3$ whilst its rear focal plane is $\pi$. These various lenses, by way of non-limitative example, in this case have the same optical axis.

Also illustrated in FIG. 1 in a highly schematic manner, is an object beam 28 produced by a device 25, illuminating an object plane 27 through the medium of an objective lens 26, and illuminating the zone A of the plane $\pi$ which constitutes a page of the storage plane.

The device S produces a beam 2 of coherent light whose axis passes through the focus of the lens $L_1$ and makes an angle $\theta$ with the axis 1. This device has been illustrated in schematic fashion in FIG. 1; it can in practice be designed in all kinds of known ways, in particular utilising a laser which produces a monochromatic coherent lightbeam, an objective lens and a deflector for producing the deflection $\theta$. It is additionally necessary to utilize the same laser as the source of two beams 2 and 28; the device 25 doing duty as the source is thus constituted by a matrix of lenses receiving the light coming from the device 15 and transmitting the beams 2 and 28 so that they converge on one and the same zone of the plane $\pi$.

The telecentric lens $L_1$ produces geometric convergence of the beam 2 at a focus B.

The deflector D is, by way of example, of acousto-optical type. It is constituted by an element 10 which produces deflection of the incident lightbeam 2, and a piezoelectric transducer 11 connected to a generator G. The element 10 can be designed using a liquid or a solid, such as Lead Molybdate; the ultrasonic waves, of wavelength $\lambda_G$, generated by the generator G in this element 10 through the medium of the transducer 11, have the effect of creating a refractory index grating; the ultrasonic wavefronts having a pitch of $p = \lambda_G$, the index grating produces diffraction of the incident optical beam 2 in the direction making an angle $\theta_1$ with the axis 1; this deflection angle $\theta_1$ is a function of $\lambda_G$ and of the optical wavelength $\lambda$ of the incident beam 2.

In FIG. 1, a geometric representation of the axis 22 of the trajectory which would be followed by a non-diffracted beam has been shown, this situation corresponding to the case where the generator G is not operating and this axis 22 being between the lenses $L_1$ and $L_2$ parallel to the axis 1. The illustration also shows three possible trajectories of the emergent beam, marked 3, 4 and 5; these three trajectories respectively correspond to three distinct values of the ultrasonic wavelength $\lambda_G$. The trajectory 3 which corresponds to a particular value of $\theta_1$ and $\lambda_G$, is chosen as the mean position of the emergent beam from the deflector D, the angular positions of the other trajectories 4 and 5 being marked by an angle $\sigma$ in relation to the axis of the beam 3.

The diffracted beams 4 and 5 converge, at an angle $\sigma'$ in relation to the axis of the beam 3. The point of convergence of the three beams 3, 4 and 5 is located at a point A in the plane $\pi$. In accordance with geometric optical laws, the position of point A is a function of the angle $\theta$ of the beam 2 in relation to the axis 1.

The zones of convergence illustrated in the FIG. 1 by the geometric points A and B, have in practice a size determined by the diffraction phenomena:

at B, the diffraction pattern obtained is the Fourier transform of the two dimensional distribution of the complex amplitudes in the wavefront emerging from the telecentric lens $L_1$; this diffraction pattern is a figure of revolution and is constituted as those skilled in the art will well appreciate, by a bright central spot the diameter of which is in particular a function of the focal length of the lens $L_1$ for a given wavelength $\lambda$, surrounded by rings whose intensities decrease very rapidly with increasing distance from the geometric centre B of the diffraction pattern. At A, the diffraction pattern is similar.

For a beam such as 2 to be suitable for use in the recording or read-out of a holographic data storage device, the photosensitive storage material organised in page fashion, the photosensitive storage material should be arranged in the storage plane $\pi$ and the area of the diffraction spot centered in A should be sufficient to cover a page, this fixing the values of the focal lengths of the lenses $L_1$, $L_2$ and $L_3$ for a given beam width and optical wavelength $\lambda$. By way of example, with a Gaussian beam 2 of around 1mm in diameter, transmitted through lenses $L_1$ and $L_2$ having the same focal length, in the order of some few tenths of centimetres, and a projection lens $L_3$ having a focal length of around 2 metres, it is possible to illuminate in the plane $\pi$ a square page with a side length of 1mm.

In addition, the values of $\lambda$, of the focal length of lens $L_1$ and of the diameter of the beam 2, also fix the dimensions of the diffraction pattern centered at B, so that the ultrasonic wavelength $\lambda_G$ is chosen within a range such that the refractory index planes created in the deflector D are sufficiently close to suitably deflect the received beam 2. In the numerical example given previously, the values of $\lambda_G$ range between around 20 microns and 40 microns.

The device described hereinbefore thus makes it possible to obtain, from a single incident beam 2, a steerable emergent beam 3, 4 or 5 converging on the plane $\pi$ in a zone of given centre A, whose position is fixed by the direction $\theta$ of the incident beam. The angle $\rho'$ in relation to the direction of the beam 3 varies within the plane of the figure as a function of the ultrasonic wavelength $\lambda_G$ of the waves created in the deflector D by the generator G. The generator G is frequency modulated by a control signal not shown.

In order to vary the angle $\rho'$ in space, it is possible to utilise the same element 10 of the deflector D, with which there are associated a further piezoelectric transducer connected to a further generator producing scattering wavefronts at rightangles to the preceding ones. Another solution is to utilise a second deflector in the manner shown in FIG. 2.

Figure 2:
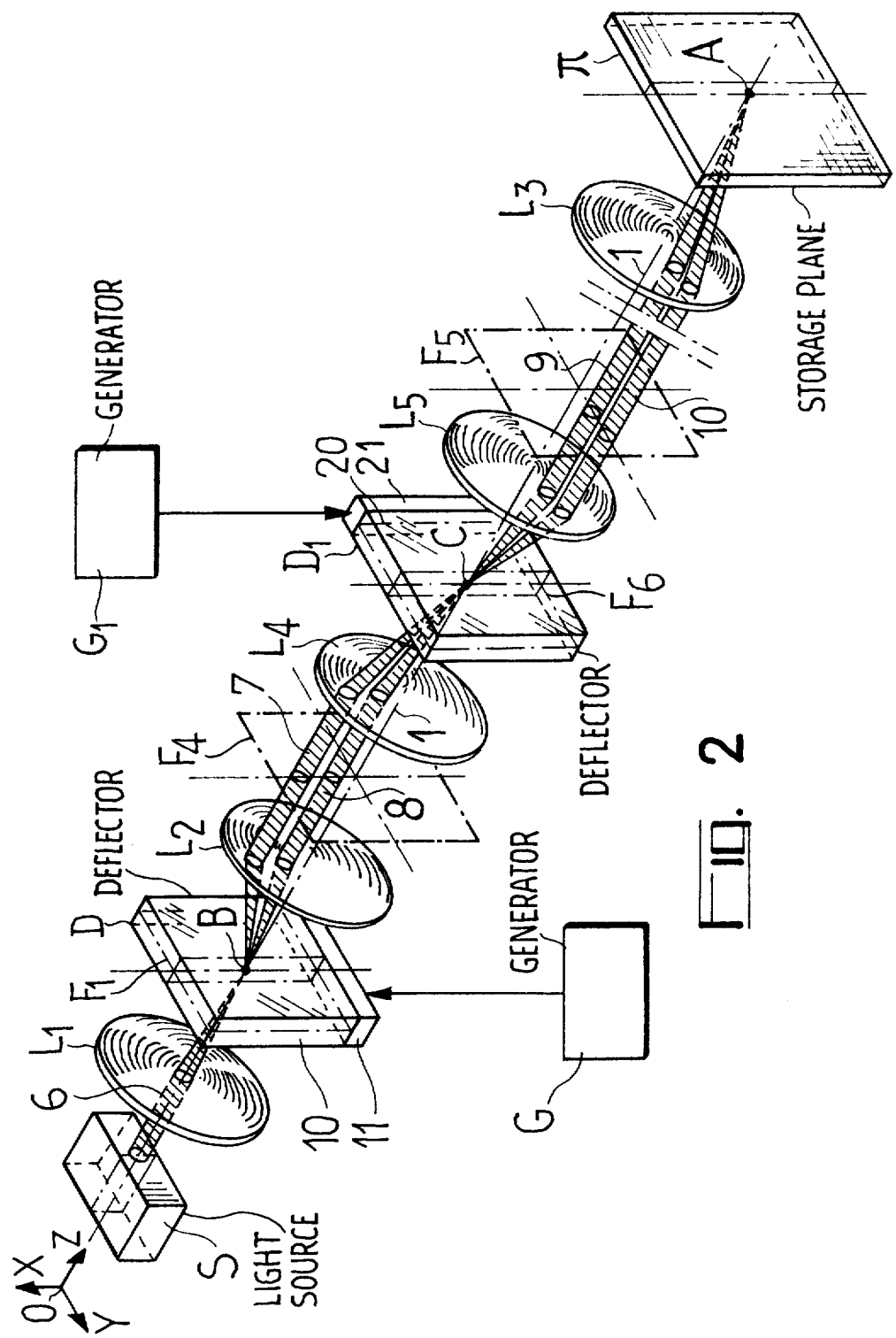
FIG. 2 illustrates a perspective view of a variant embodiment of the optical deflector arrangement in accordance with the invention.

FIG. 2 shows in perspective the same elements already shown in FIG. 1, namely the device S, the deflector D, the plane $\pi$ and the lenses $L_1$, $L_2$ and $L_3$, all arranged in the same way as before with the exception of the focal plane $F_3$ common to the lenses $L_2$ and $L_3$ in FIG. 1. In other words, in FIG. 2, between the rear focal plane $F_4$ of the lens $L_2$ and the anterior focal plane $F_5$ of the lens $L_3$, elements have been inserted which make it possible to deflect lightbeams in accordance with the other coordinate axis. These elements have the same optical axis 1, constituting the axis OZ, as the elements already illustrated in FIG. 1. They comprise a deflector $D_1$ and two lenses $L_4$ and $L_5$ located at either side thereof. The plane of the deflector parallel to XOY is coincident with the rear focal plane of lens $L_4$ and the anterior focal plane of lens $L_5$. The anterior focal plane of lens $L_4$ and the rear focal plane of lens $L_5$ are respectively coincident with the planes $F_4$ and $F_5$. The deflector $D_1$ can advantageously be constituted, like the deflector D, by an element 20 the section of which, in the plane XOY, is square, this element producing the deflection of the lightbeams, and by a piezoelectric transducer 21 connected to a frequency modulated generator $G_1$.

In FIG. 2, the deflector D, with the help of ultrasonic scattering wavefronts created by the generator G parallel to the plane YOZ, deflects the incident beam 6 in the plane XOZ. For this X-deflection, two possible emergent trajectories have been represented by two beams 7 and 8, which thus converge geometrically at C, in the plane of symmetry of the deflector $D_1$. The point C, as already mentioned is the centre of a diffraction pattern similar to the diffraction pattern centered at B. The beams 7 or 8 are then deflected by the deflector $D_1$ with the help of ultrasonic scattering wavefronts parallel to the plane XOZ and created by the generator $G_1$. An incident beam in the plane XOZ is thus deflected in the direction OY. For this latter Y deflection, two possible trajectories, 9 and 10, have been illustrated for the emergent beam from the deflector $D_1$. These beams converge geometrically in a plane at a point A, in the manner described hereinbefore.

It is thus possible, by means of a deflection device of this kind, to vary the angle of incidence of the beam in a given zone of centre A, by a discrete succession of n arbitrary positions about the mean position of the beam successively emerging from the two deflectors D and $D_1$, each of these positions being marked by a pair of specific values of the frequencies produced by the generator G and $G_1$. It is possible, however, to match with one another these two values so that the n positions are arranged upon a cone whose apex A has said mean position as its axis.

This variation in angle of incidence is produced extremely quickly, accurately and reproducibly and, accordingly, is particularly well-suited to the storage of data in high-density fashion, in a holographic store.

What I claim is:

1. An optical deflector for electrically steering and focusing a collimated beam of light into a selected area in a predetermined plane having a plurality of selectable areas and at a selected angle of incidence said optical deflector comprising: means for producing a collimated beam of light and for selectively deflecting said beam in one of a plurality of angular directions so as to control the particular area selected in said predetermined plane, a telecentric lens positioned for receiving said collimated beam, said beam having an axis that passes through the front focal point of said telecentric lens, an intermediate lens having an anterior focal plane coincident with the rear focal plane of said telecentric lens, a projection lens having its rear focal plane coincident with said predetermined plane for focusing onto said selected area the light emerging from said intermediate lens, and electrically controllable optical deflector means positioned in said coincident focal planes of said telecentric and intermediate lenses for controlling the direction of the focused radiant energy incident onto said selected area.

2. Optical deflector as claimed in claim 1, wherein said optical deflector comprise an acousto-optical deflector; the deflection plane of said acousto-optical deflector being parallel to the common optical axis of said telecentric and intermediate lenses; said coincident focal planes being perpendicular to said deflection plane and located inside the body of said acousto-optical deflector.

3. Optical deflector arrangement as claimed in claim 1, wherein said intermediate and projection lenses have a common focal plane.

4. An optical deflector as claimed in claim 1 further comprising two further convergent lenses having a common focal plane and another electrically controllable optical deflector means located at said common focal plane, said two further lenses and said another deflector means being arranged between said intermediate lens and said projection lens.

* * * * *